(12) United States Patent
Kim et al.

(10) Patent No.: US 10,309,769 B2
(45) Date of Patent: Jun. 4, 2019

(54) LIGHT SOURCE DEVICE AND MEASURING INSTRUMENT USING CHANGE OVER TIME OF INTENSITY OF MODE-LOCKED OSCILLATED OUTPUT LIGHT

(71) Applicant: Pusan National University Industry-University Cooperation Foundation, Busan (KR)

(72) Inventors: Changseok Kim, Busan (KR); Hwidon Lee, Seoul (KR); Myungyung Jeong, Busan (KR); Gyeonghun Kim, Pohang-si (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 0 days.

(21) Appl. No.: 15/769,421

(22) PCT Filed: Jun. 30, 2016

(86) PCT No.: PCT/KR2016/007050
§ 371 (c)(1),
(2) Date: Apr. 19, 2018

(87) PCT Pub. No.: WO2017/069379
PCT Pub. Date: Apr. 27, 2017

(65) Prior Publication Data
US 2018/0306574 A1 Oct. 25, 2018

(30) Foreign Application Priority Data
Oct. 23, 2015 (KR) ........................ 10-2015-0148089

(51) Int. Cl.
*H01S 3/08* (2006.01)
*G01B 11/24* (2006.01)
(Continued)

(52) U.S. Cl.
CPC ...... *G01B 11/2441* (2013.01); *G01B 9/02091* (2013.01); *H01S 3/08* (2013.01); *H01S 3/094* (2013.01); *H01S 3/11* (2013.01)

(58) Field of Classification Search
CPC ......... G01B 9/02091; H01S 3/00; H01S 3/08; H01S 3/11; H01S 3/094
See application file for complete search history.

(56) References Cited

U.S. PATENT DOCUMENTS

| 2007/0091941 A1* | 4/2007 | Mori | ................. H01S 3/06754 |
| | | | 372/18 |
| 2012/0026503 A1* | 2/2012 | Lewandowski | .... G01N 21/4795 |
| | | | 356/477 |
| 2013/0169972 A1* | 7/2013 | Kim | ................. G01N 21/4795 |
| | | | 356/479 |

FOREIGN PATENT DOCUMENTS

| JP | 2010-112867 A | 5/2010 |
| KR | 10-0475579 B1 | 3/2005 |

(Continued)

*Primary Examiner* — Jonathan M Hansen
(74) *Attorney, Agent, or Firm* — Rabin & Berdo, P.C.

(57) ABSTRACT

The present invention relates to a light source device and a measuring device which use a change in mode-locked resonated output light over time using a change in a cycle of an electrical signal corresponding to a change in the intensity of the output light according to a mode locking condition for each of different light paths in a resonator. The light source device includes an electrical signal generator configured to control the intensity of an optical signal from the light source device, and an optical gain unit controlled by periodic electrical signals having cycles calculated by dividing a round-trip time of photons corresponding to each of different light paths by an integer multiple. The intensity of the optical signal is controlled by the optical gain unit.

22 Claims, 8 Drawing Sheets

(51) Int. Cl.
*H01S 3/094* (2006.01)
*H01S 3/11* (2006.01)
*G01B 9/02* (2006.01)

(56) References Cited

FOREIGN PATENT DOCUMENTS

| KR | 10-2008-0111962 A | 12/2008 |
|----|-------------------|---------|
| KR | 10-1026356 B1 | 4/2011 |
| KR | 10-2012-0044391 A | 5/2012 |

* cited by examiner

LIGHT SOURCE DEVICE AND MEASURING INSTRUMENT USING CHANGE OVER TIME OF INTENSITY OF MODE-LOCKED OSCILLATED OUTPUT LIGHT

TECHNICAL FIELD

The present invention relates to a light source device, and more particularly, to a light source device and a measuring device which use a change in a cycle of an electrical signal corresponding to a change in the intensity of output light according to a mode locking condition for each of different light paths in a resonator.

BACKGROUND ART

In general, a mode locking technique is a light source technique for creating a short optical pulse by applying a periodic electrical signal having a cycle calculated by dividing a round-trip time of a photon in a resonator by an integer multiple.

The intensity of an output light pulse oscillated in this case is maximized when a mode locking condition that a cycle of an electrical signal should correspond to an integer multiple of a round-trip time of a photon is satisfied. Generally, such a light source is applicable to optical communication technology or an image measuring device configured as a separate device.

An image measuring device using mode-locked laser includes an optical coherence tomography (OCT) imaging device which obtains a depth-direction image of a sample using a light coherence phenomenon.

The OCT imaging device is an imaging system capable of obtaining and displaying an image of a cross section of an internal tissue of a sample. The OCT imaging device is a device employing an interference principle of a light source having a wavelength range of near-infrared light using an additional optical interferometer.

In particular, an OCT imaging technique is an imaging technique for contrasting the inside of a sample in a non-contact manner. Recently, research has been being actively conducted thereon.

In the OCT imaging device, center wavelength-variable laser is used to obtain depth-direction information. In the wavelength-variable laser using mode locking, a cycle of a periodic electrical signal is changed over time using a dispersion medium or a wavelength light path difference induction device. Thus, a wavelength of light is changed using output light oscillating while satisfying a different mode locking condition for each wavelength. In this case, the cycle of the periodic electrical signal is linearly changed over time and thus the intensity of the output light is constantly maintained while a wavelength thereof is linearly changed.

Various features, such as a high light output, a wide wavelength-variable range, high wavelength-variable linearity, a narrow oscillation line width, etc., should be satisfied so that the wavelength-variable laser may be applicable to imaging devices.

A maximum image depth or a surface step difference of an optical tomographic imaging device using the wavelength-variable laser does not exceed several mm and is determined by a coherence length of a light source.

Such an OCT imaging device using the wavelength-variable laser includes a wavelength-variable light source unit, a distance difference optical interference unit, an optical interference measuring unit, a time-distance conversion signal processor, etc. as illustrated in FIG. 1, and employs an additional signal processing method to obtain distance information by measuring an interference signal of light which changes over time.

The signal processor performs various signal processing processes such as correcting linearity according to a temporal change, time-distance Fourier transformation, etc. and thus has disadvantages such as time restrictions, an increase in manufacturing costs, etc.

In particular, a range of depth measurement is limited by a coherence length of a light source and thus applying the range of depth measurement to a shape measuring device is limited.

DISCLOSURE

Technical Problem

To address the problems of a sensor measuring device and an image measuring device and a light source device used therein according to the related art as described above, the present invention is directed to providing a light source device and a measuring device which use a change in a cycle of an electrical signal corresponding to a change in the intensity of output light according to a mode locking condition for each of different light paths in a resonator.

The present invention is directed to providing a light source device and a measuring device which use a change in the intensity of mode-locked oscillated output light over time, in which a light path in a resonator is measured by inputting a cycle of an electrical signal changing over time to a light source oscillating output light corresponding to a different electrical signal cycle input for each light path in a resonator and then measuring a change in the intensity of output light oscillated to correspond to the electrical signal cycle over time.

The present invention is directed to providing a light source device and a measuring device which use a change in the intensity of mode-locked oscillated output light over time, in which a shape of a reflector corresponding to a light path is measured by inputting a frequency of an electrical signal changing over time to a light source oscillating output light corresponding to a different electrical signal cycle input for each light path in a resonator and then measuring a change in the intensity of output light oscillated to correspond to the frequency of the electrical signal over time.

The present invention is directed to providing a method of identifying a light path in a resonator by inducing mode locking through time control of a radio frequency (RF) corresponding to a cycle of an electrical signal, and a measuring device employing the same.

The present invention is directed to providing a light source device and a measuring device which use a change in the intensity of mode-locked oscillated output light over time, in which a reflector of a light source unit is configured as a measuring means and depth information is obtained by identifying a section in which mode locking relatively occurs by checking an RF on the basis of a temporal position of an optical intensity output.

The present invention is directed to providing a light source device and a measuring device which use a change in the intensity of mode-locked oscillated output light over time, in which the intensity of an optical signal is controlled by an optical gain unit controlled by a periodic electrical signal having a cycle time calculated by dividing a round-trip time of a photon corresponding to each of different light paths by an integer multiple.

Objects of the present invention are not, however, limited thereto, and other objects thereof which are not mentioned herein will be apparent to those of ordinary skill in the art from the following description.

Technical Solution

To achieve the above purposes, one aspect of the present invention provides a light source device which uses a change in intensity of mode-locked oscillated output light over time, the light source device including an electrical signal generator configured to control intensity of an optical signal from the light source device, and an optical gain unit configured to be controlled by a periodic electrical signal having a cycle calculated by dividing a round-trip time of a photon corresponding to each of different light paths by an integer multiple, wherein the intensity of the optical signal is controlled by the optical gain unit.

Here, in a resonator of the light source device, a reflective optical gain unit, a light splitter, and a reflector may be linearly located.

In a resonator of the light source device, a transmissive optical gain unit, a partial reflector, and a reflector may be linearly located.

In a resonator of the light source device, a transmissive optical gain unit, a light circulator, a reflector, and a light splitter may be located in a ring structure.

A resonator of the light source device may include a reflector including a scanning emitter configured to emit and receive light while changing a position thereof over time, the reflector being in a form in which a surface and an inner shape of an object are measured on the basis of a distribution of positions according to a light path distance difference between one or multiple reflective layers of the object.

A resonator of the light source device may include a reflector including a distribution emitter configured to emit and receive light by simultaneously distributing the light to a plurality of paths, the reflector being in a form in which a surface and an inner shape of an object are measured on the basis of a distribution of positions according to a light path distance difference between one or multiple reflective layers of the object.

A resonator of the light source device may include a reflector including an optical connector configured to emit and receive light via an optical fiber, the reflector being in a form in which a state of the optical fiber is sensed and measured on the basis of a distribution of positions according to a light path distance difference between one or multiple reflective layers of the optical fiber.

A resonator of the light source device may include an electro-optic device configured to control intensity of an optical signal by receiving a periodic electrical signal, in place of the optical gain unit.

Another aspect of the present invention provides a measuring device which uses a change in intensity of mode-locked oscillated output light over time, the measuring device including an electrical signal generator configured to control intensity of an optical signal from a light source device; an optical gain unit configured to be controlled by a periodic electrical signal having a cycle time calculated by dividing a round-trip time of a photon corresponding to each of different light paths by an integer multiple; and a reflector configured to generate a reflective signal at a specific light path distance such that the reflective signal is oscillated at a maximum level when a specific periodic electrical signal corresponding to a mode locking condition is applied.

Another aspect of the present invention provides a measuring device which uses a change in intensity of mode-locked oscillated output light over time, the measuring device including an electrical signal generator configured to output periodic electrical signals having cycles calculated by dividing a round-trip time of photons corresponding to each of different light paths by an integer multiple such that the cycles change over time; an optical gain unit configured to generate light and amplify intensity of the light, under periodic control of a periodic electrical signal; a light splitter configured to split the intensity of light at a certain ratio; and a reflector configured to generate a reflective signal at a specific light path distance such that the reflective signal is oscillated at a maximum level when a specific periodic electrical signal corresponding to a mode locking condition is applied.

Another aspect of the present invention provides a measuring device which uses a change in intensity of mode-locked oscillated output light over time, the measuring device including an electrical signal generator configured to output periodic electrical signals having cycles calculated by dividing a round-trip time of photons corresponding to each of different light paths by an integer multiple such that the cycles change over time; an optical gain unit configured to generate light and amplify intensity of the light, under periodic control of a periodic electrical signal from the electrical signal generator; a reflector configured to generate a reflective signal at a specific light path distance such that the reflective signal is oscillated at a maximum level when a specific periodic electrical signal corresponding to a mode locking condition is applied; and a partial reflector configured to transmit a part of the intensity of light and reflect the remainder.

Another aspect of the present invention provides a measuring device which uses a change in intensity of mode-locked oscillated output light over time, the measuring device including an electrical signal generator configured to output periodic electrical signals having cycles calculated by dividing a round-trip time of photons corresponding to each of different light paths by an integer multiple such that the cycles change over time; an optical gain unit configured to generate light and amplify intensity of the light, under periodic control of a periodic electrical signal from the electrical signal generator; a light circulator configured to change a propagation path of the light output from optical gain unit; a reflector configured to generate a reflective signal at a specific light path distance such that the reflective signal is oscillated at a maximum level when a specific periodic electrical signal corresponding to a mode locking condition is applied; and a light splitter configured to split the intensity of light at a certain ratio.

Another aspect of the present invention provides a measuring device which uses a change in intensity of mode-locked oscillated output light over time, the measuring device including an electrical signal generator configured to output periodic electrical signals having cycles calculated by dividing a round-trip time of photons corresponding to each of different light paths by an integer multiple such that the cycles change over time; an electro-optic device configured to be controlled by a periodic electrical signal from the electrical signal generator; an optical gain unit configured to generate light and amplify intensity of the light; a light splitter configured to split the intensity of light at a certain ratio; and a reflector configured to generate a reflective signal at a specific light path distance such that the reflective signal is oscillated at a maximum level when a specific periodic electrical signal corresponding to a mode locking condition is applied.

Another aspect of the present invention provides a measuring device which uses a change in intensity of mode-locked oscillated output light over time, the measuring device including an electrical signal generator configured to output periodic electrical signals having cycles calculated by dividing a round-trip time of photons corresponding to each of different light paths by an integer multiple such that the cycles change over time; an electro-optic device configured to be controlled by a periodic electrical signal from the electrical signal generator; an optical gain unit configured to generate light and amplify intensity of the light; a reflector configured to generate a reflective signal at a specific light path distance such that the reflective signal is oscillated at a maximum level when a specific periodic electrical signal corresponding to a mode locking condition is applied; and a partial reflector configured to transmit a part of the intensity of light and reflect the remainder.

Another aspect of the present invention provides a measuring device which uses a change in intensity of mode-locked oscillated output light, the measuring device including an electrical signal generator configured to output periodic electrical signals having cycles calculated by dividing a round-trip time of photons corresponding to each of different light paths by an integer multiple such that the cycles change over time; an electro-optic device configured to be controlled by a periodic electrical signal from the electrical signal generator; an optical gain unit configured to generate light and amplify intensity of the light; a light circulator configured to change a propagation path of the light; a reflector configured to generate a reflective signal at a specific light path distance such that the reflective signal is oscillated at a maximum level when a specific periodic electrical signal corresponding to a mode locking condition is applied; and a light splitter configured to split the intensity of light at a certain ratio.

Here, the reflector may include a scanning emitter configured to emit and receive light while changing a position thereof over time, the reflector being in a form in which a surface and an inner shape of an object are measured on the basis of a distribution of positions according to a light path distance difference between one or multiple reflective layers of the object.

The reflector may include a distribution emitter configured to emit and receive light by simultaneously distributing the light to a plurality of paths, the reflector being in a form in which a surface and an inner shape of an object are measured on the basis of a distribution of positions according to a light path distance difference between one or multiple reflective layers of the object.

The reflector may include an optical connector configured to emit and receive light via an optical fiber, the reflector being in a form in which a state of the optical fiber is sensed and measured on the basis of a distribution of positions according to a light path distance difference between one or multiple reflective layers of the optical fiber.

Advantageous Effects

A light source device and a measuring device according to the present invention which use a change in the intensity of mode-locked oscillated output light over time as described above have the following effects.

First, the efficiency of a light source device can be improved using a change in a cycle of an electrical signal corresponding to a change in the intensity of output light according to a mode locking condition for each of different light paths in a resonator.

Second, a light path in a resonator can be measured by measuring a change in output light over time by linearly changing a cycle of an electrical signal in a light source over time, the output light being oscillated to correspond to the cycle of the electrical signal.

Third, a shape of a reflector corresponding to a light path can be measured by measuring a change in output light, which is oscillated repeatedly, over time by inputting a frequency of an electrical signal which repeatedly changes.

Fourth, a method of acquiring a light path in a resonator by inducing mode locking through time control of an RF corresponding to a cycle of an electrical signal, and an image measuring device using the method can be provided.

Fifth, a reflector of a light source unit is configured as a measuring means, and depth information can be obtained by identifying a section in which mode locking relatively occurs by checking an RF corresponding to a cycle of an electrical signal using a temporal position of an optical intensity output. Accordingly, a measuring device can be easily configured.

Sixth, the intensity of an optical signal can be controlled by an optical gain unit controlled by a periodic electrical signal having a cycle time calculated by dividing a round-trip time of a photon corresponding to each of different light paths by an integer multiple, thereby increasing optical efficiency.

Seventh, a reflector of a light source unit can be configured as a measuring means when applied to a measuring device so that an additional distance difference optical interference unit or a signal processing operation may be eliminated, thereby increasing the speed of obtaining an image and decreasing manufacturing costs.

Eighth, a range of depth measurement can be suppressed from being limited by a coherence length of a light source and thus can be easily applicable to an image measuring device.

BEST MODE

Figure 1:
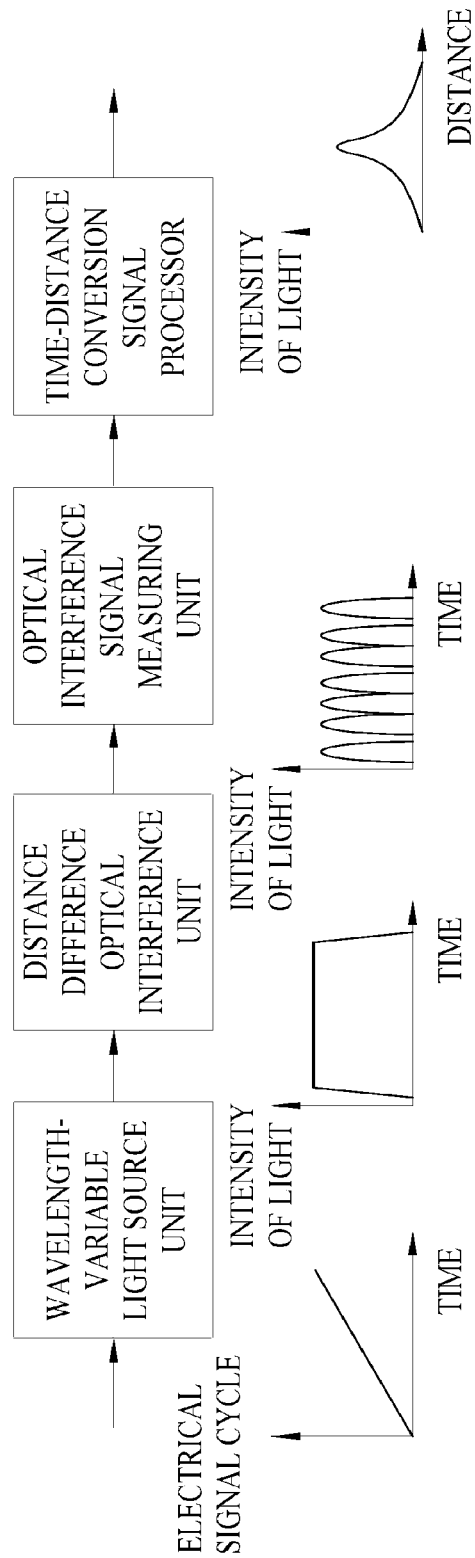
FIG. 1 is a diagram illustrating the configurations of a light source device and a measuring device according to the related art.

Hereinafter, a light source device and a measuring device which use a change in the intensity of mode-locked oscillated output light over time according to exemplary embodiments of the present invention will be described in detail.

Features and advantages of the light source device and the measuring device which use a change in the intensity of mode-locked oscillated output light over time according to embodiments of the present invention will be apparent from a detailed description of the following embodiments.

FIGS. 2 to 7 are diagrams illustrating the configurations of a light source device and a measuring device which use a change in the intensity of mode-locked oscillated output light over time, according to embodiments of the present invention.

In the present invention, a reflector of a light source unit is configured as a measuring means, and depth information may be obtained by identifying a section in which mode locking relatively occurs by checking a radio frequency (RF) using a temporal position of an optical intensity output.

The present invention provides an image measuring device and a sensor measuring device each having a light source device as described above.

Each of the light source device and the measuring device which use a change in the intensity of a mode-locked oscillated output light over time according to the present invention has a configuration, in which the intensity of an optical signal is controlled by an optical gain unit controlled by a periodic electrical signal having a cycle time calculated by dividing a round-trip time of a photon corresponding to each of different light paths by an integer multiple.

To this end, a resonator of a light source device which uses a change in the intensity of oscillated output light over time has a form, in which a reflective optical gain unit, a light splitter, and the reflector are linearly located.

Alternatively, the resonator has a form, in which a transmissive optical gain unit, a partial reflector, and the reflector are linearly located.

Alternatively, the resonator has a form, in which a transmissive optical gain unit, a light circulator, the reflector, and a light splitter are located in a ring structure.

Here, the reflector may have a form including one or multiple reflective layers, and the resonator may have a form including an electro-optic device.

A measuring device having a light source device which uses a change in the intensity of mode-locked oscillated output light over time as described above includes an electrical signal generator configured to output a periodic electrical signal having a cycle time calculated by dividing a round-trip time of a photon corresponding to each of different paths by an integer multiple, an optical gain unit configured to generate light and amplify the intensity of light and be controlled by a control signal from the electrical signal generator, and a reflector configured to generate one or multiple reflective signals in a resonator.

The measuring device using the light source device described above may be an object surface and inner shape measuring device or a sensor measuring device which obtains distance information of a light path of the reflector using a change in the intensity of mode-locked oscillated output light over time.

However, a light source device and a measuring device which use a change in the intensity of mode-locked oscillated output light over time according to the present invention are not limited thereto, and may be embodied in many different forms, provided that they include one of the following:

a configuration using a periodic change in a frequency of an electrical signal corresponding to a change in the intensity of output light according to a mode locking condition for each of different light paths in a resonator, a configuration for measuring a light path in a resonator by measuring a change in output light, which is oscillated periodically, over time by inputting a frequency of an electrical signal changing periodically to a light source oscillating output light corresponding to a different electrical signal frequency input for each of light paths in a resonator, a configuration for measuring a shape of a reflector corresponding to a light path by measuring a change in output light, which is oscillated periodically, over time by inputting a frequency of an electrical signal changing periodically to a light source oscillating output light corresponding to a different electrical signal frequency input for each of light paths in a resonator, a configuration for acquiring a light path in a resonator by inducing mode locking to occur through time control of an RF of an electrical signal, a configuration in which a reflector of a light source unit is configured as a measuring means and depth information is obtained by identifying a section in which mode locking relatively occurs by checking an RF using a temporal position of an optical intensity output, and a configuration in which the intensity of an optical signal is controlled by an optical gain unit controlled by a periodic electrical signal having a cycle time calculated by dividing a round-trip time of a photon corresponding to each of different light paths by an integer multiple.

An image measuring device using a change in the intensity of mode-locked oscillated output light over time according to the present invention has a configuration that does not include an optical interference unit.

The image measuring device further includes a configuration in which a light path in a resonator is determined by features of a reflector.

In an image measuring device using a change in the intensity of mode-locked oscillated output light over time according to the present invention, an image is measured by measuring the intensity of an optical signal over time without performing an additional signal processing process.

The image measuring device includes a configuration for measuring the intensity of an optical signal through time control of a frequency of an electrical signal (an RF signal), and a configuration for obtaining an image through time control of a frequency of an electrical signal (an RF signal).

A resonator having a reflective measuring unit includes a configuration for obtaining an image through time control of a frequency of an electrical signal.

Figure 2:
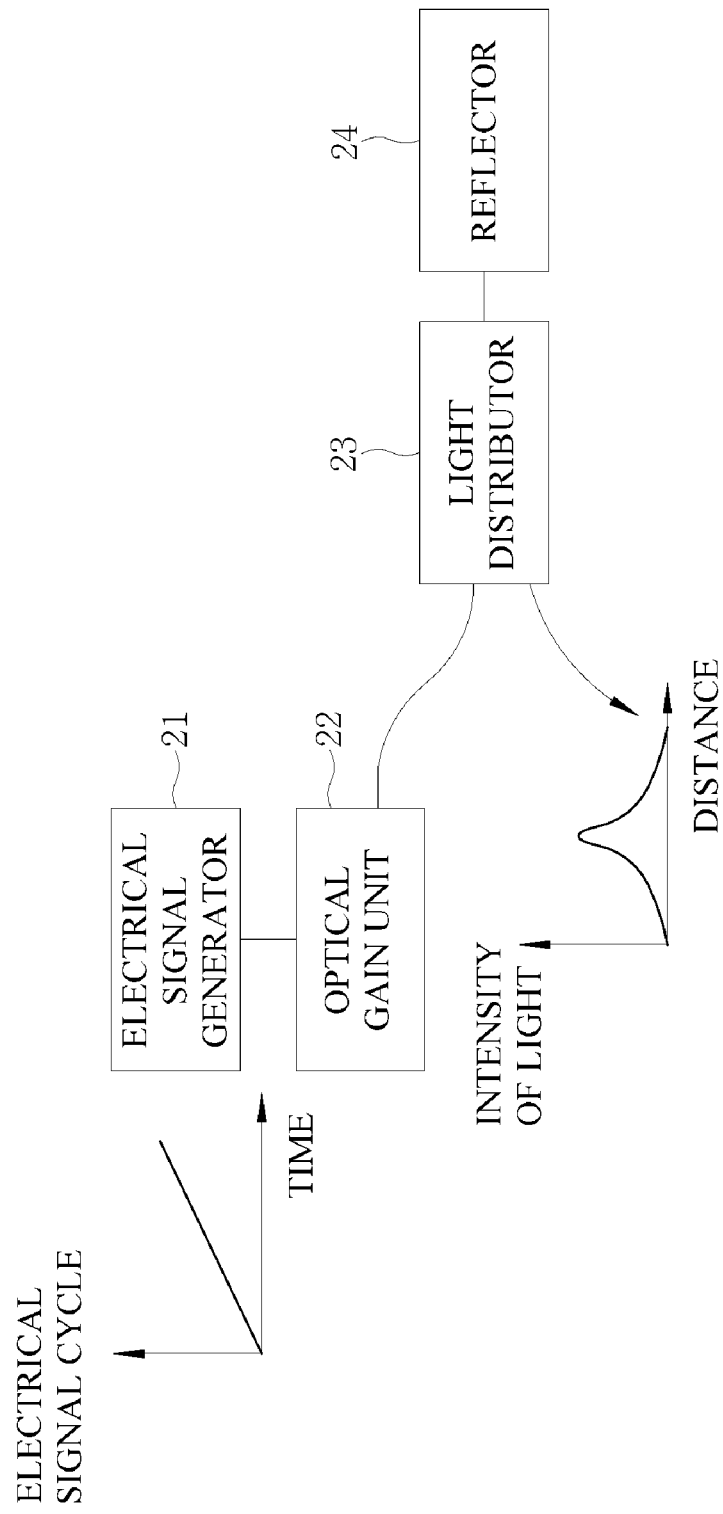
FIGS. 2 to 7 are diagrams illustrating the configurations of a light source device and a measuring device which use a change in the intensity of mode-locked oscillated output light over time, according to embodiments of the present invention.

As illustrated in FIG. 2, a light source device using a change in the intensity of mode-locked oscillated output light over time according to an embodiment of the present invention includes an electrical signal generator 21 configured to output periodic electrical signals having cycles calculated by dividing a round-trip time of photons corresponding to each of different paths by an integer multiple such that the cycles change over time, an optical gain unit 22 configured to generate light and amplify the intensity of light, under periodic control performed using a periodic electrical signal, a light splitter 23 configured to split the intensity of light at a certain ratio, and a reflector 24 configured to generate a reflective signal at a specific light path distance such that the reflective signal is oscillated at a maximum level when a specific periodic electrical signal corresponding to a mode locking condition is applied.

Figure 3:
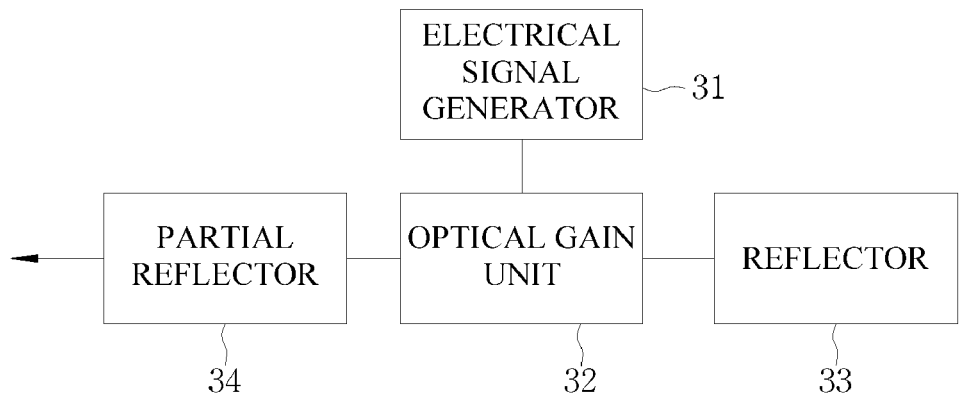

As illustrated in FIG. 3, a light source device using a change in the intensity of mode-locked oscillated output light over time according to an embodiment of the present invention includes an electrical signal generator 31 configured to output periodic electrical signals having cycles calculated by dividing a round-trip time of photons corresponding to each of different paths by an integer multiple such that the cycles change over time, an optical gain unit 32 configured to generate light and amplify the intensity of light, under periodic control performed using a periodic electrical signal from the electrical signal generator 31, a reflector 33 configured to generate a reflective signal at a specific light path distance such that the reflective signal is oscillated at a maximum level when a specific periodic electrical signal corresponding to a mode locking condition is applied, and a partial reflector 34 configured to transmit a part of the intensity of light and reflect the remainder.

Figure 4:
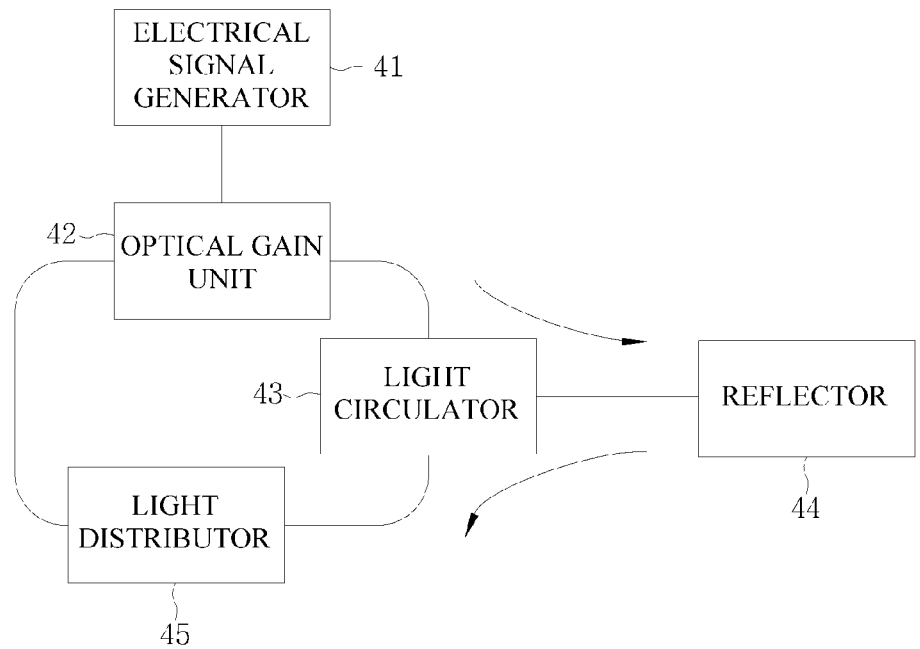

As illustrated in FIG. 4, a light source device using a change in the intensity of mode-locked oscillated output light over time according to an embodiment of the present invention includes an electrical signal generator 41 configured to output periodic electrical signals having cycles calculated by dividing a round-trip time of photons corresponding to each of different paths by an integer multiple such that the cycles change over time, an optical gain unit 42 configured to generate light and amplify the intensity of light under periodic control performed using a periodic electrical signal from the electrical signal generator 41, a light circulator 43 configured to change a propagation path of light output from the optical gain unit 42, a reflector 44 configured to generate a reflective signal at a specific light path distance such that the reflective signal is oscillated at a maximum level when a specific periodic electrical signal corresponding to a mode locking condition is applied, and a light splitter 45 configured to split the intensity of light at a certain ratio.

Figure 5:
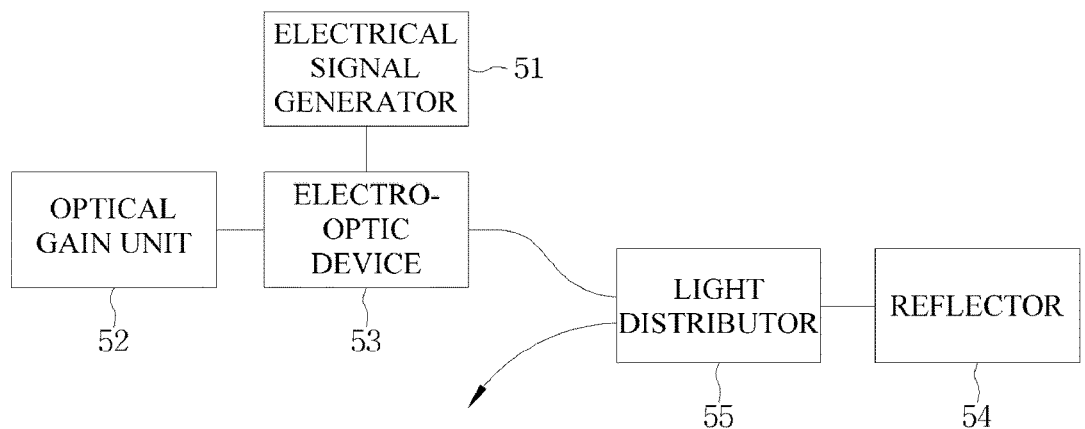

As illustrated in FIG. 5, a light source device using a change in the intensity of mode-locked oscillated output light over time according to an embodiment of the present invention includes an electrical signal generator 51 configured to output periodic electrical signals having cycles calculated by dividing a round-trip time of photons corresponding to each of different paths by an integer multiple such that the cycles change over time, an electro-optic device 53 configured to be controlled by a periodic electrical signal from the electrical signal generator 51, an optical gain unit 52 configured to generate light and amplify the intensity of light, a light splitter 55 configured to split the intensity of light at a certain ratio, and a reflector 54 configured to generate a reflective signal at a specific light path distance such that the reflective signal is oscillated at a maximum level when a specific periodic electrical signal corresponding to a mode locking condition is applied.

Figure 6:
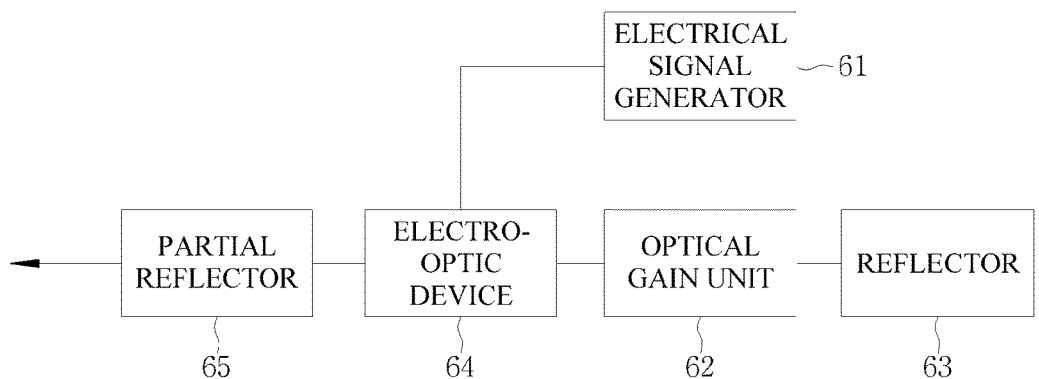

As illustrated in FIG. 6, a light source device using a change in the intensity of mode-locked oscillated output light over time according to an embodiment of the present invention includes an electrical signal generator 61 configured to output periodic electrical signals having cycles calculated by dividing a round-trip time of photons corresponding to each of different paths by an integer multiple such that the cycles change over time, an electro-optic device 64 controlled by a periodic electrical signal from the electrical signal generator 61, an optical gain unit 62 configured to generate light and amplify the intensity of light, a reflector 63 configured to generate a reflective signal at a specific light path distance such that the reflective signal is oscillated at a maximum level when a specific periodic electrical signal corresponding to a mode locking condition is applied, and a partial reflector 65 configured to transmit a part of the intensity of light and reflect the remainder.

Figure 7:
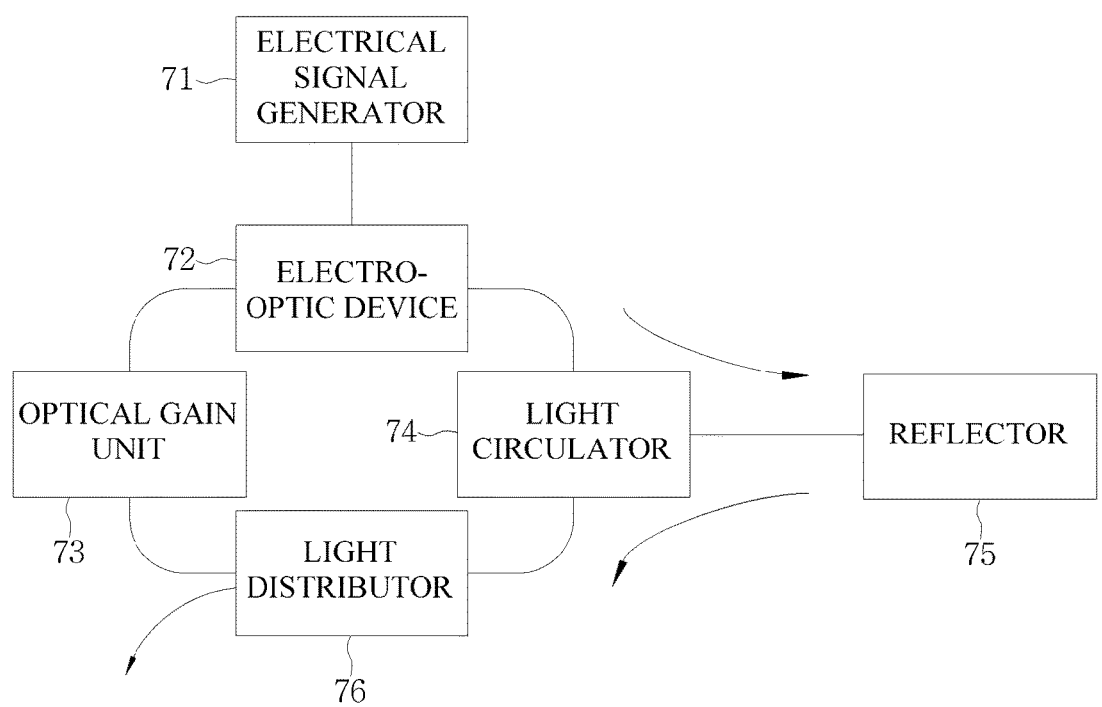

As illustrated in FIG. 7, a light source device using a change in the intensity of mode-locked oscillated output light over time according to an embodiment of the present invention includes an electrical signal generator 71 configured to output periodic electrical signals having cycles calculated by dividing a round-trip time of photons corresponding to each of different paths by an integer multiple such that the cycles change over time, an electro-optic device 72 controlled by a periodic electrical signal from the electrical signal generator 71, an optical gain unit 73 configured to generate light and amplify the intensity of light, a light circulator 74 configured to change a propagation path of light, a reflector 75 configured to generate a reflective signal at a specific light path distance such that the reflective signal is oscillated at a maximum level when a specific periodic electrical signal corresponding to a mode locking condition is applied, and a light splitter 76 configured to split the intensity of light at a certain ratio.

A measuring device using a light source device according to an embodiment of the present invention as described above is an object surface and inner shape measuring device or a sensor measuring device which obtains distance information of a light path of a reflector using a change in the intensity of mode-locked oscillated output light over time.

The configurations of reflectors of a light source device and a measuring device according to the present invention will be described in detail below.

Figure 8:
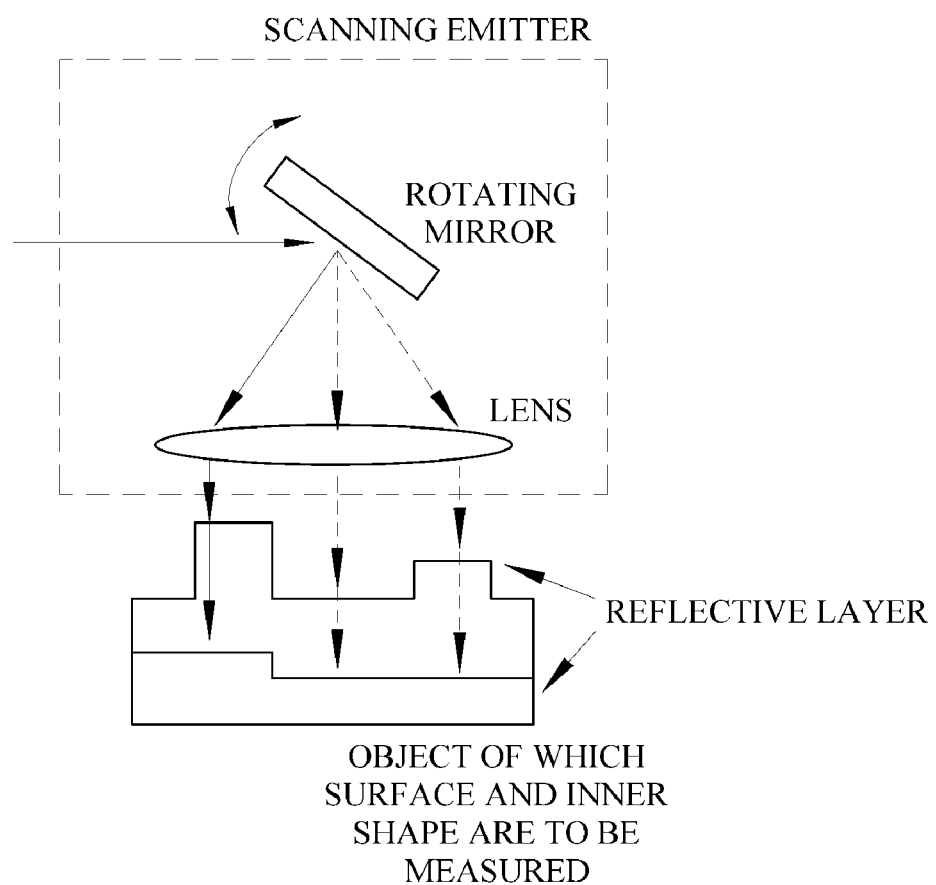
FIGS. 8 to 10 are detailed diagrams illustrating the configurations of reflectors of a light source device and a measuring device which use a change in the intensity of mode-locked oscillated output light over time, according to embodiments of the present invention.
Figure 9:
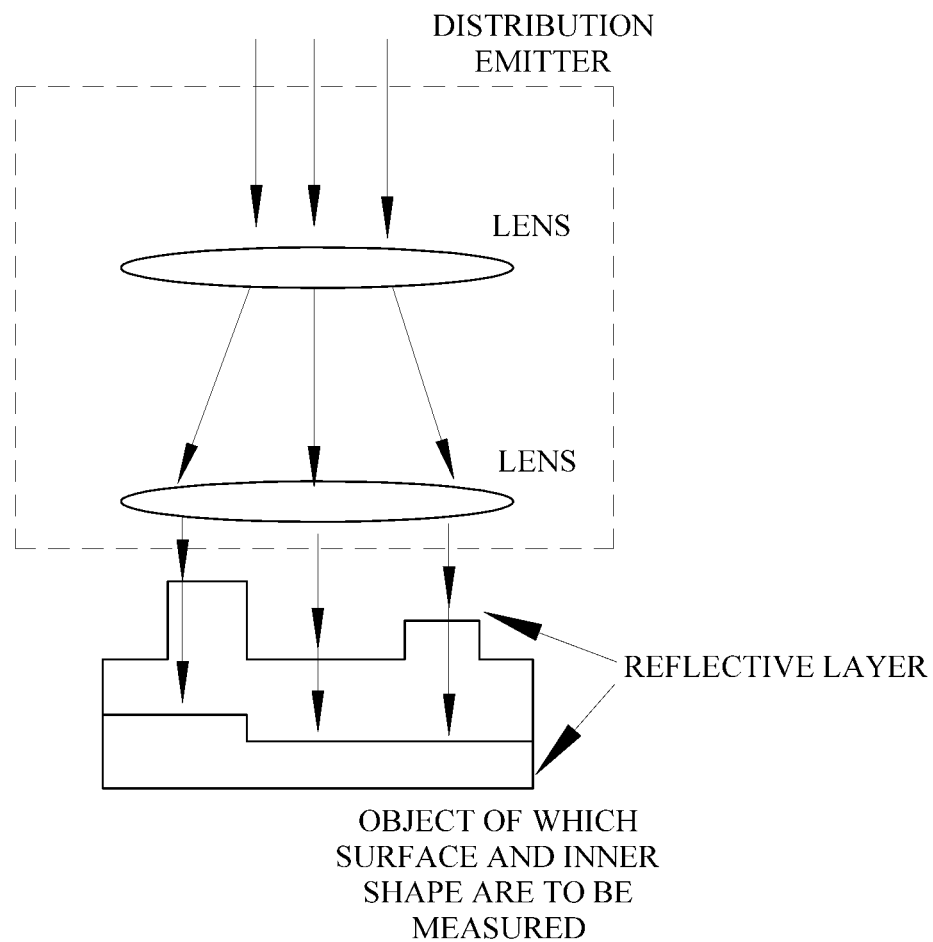
Figure 10:
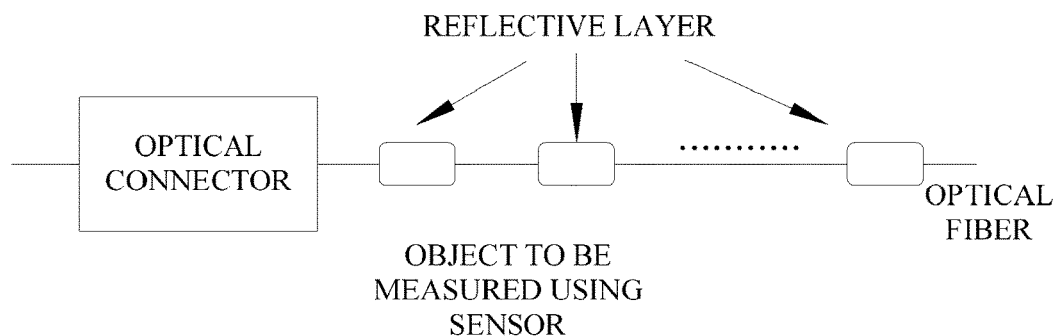

FIGS. 8 to 10 are detailed diagrams illustrating the configurations of reflectors of a light source device and a measuring device which use a change in the intensity of mode-locked oscillated output light over time, according to embodiments of the present invention.

Configurations of reflectors applicable to a light source device and a measuring device according to embodiments will be described below but it will be apparent that embodiments are not limited to the structures illustrated in FIGS. 8 to 10.

First, as illustrated in FIG. 8, a reflector of each of a light source device and a measuring device may include a scanning emitter which has a light collimator, a rotating mirror, and a lens and which is configured to emit and receive light while changing a position thereof over time, and may be in a form in which a surface and an inner shape of an object are measured on the basis of a distribution of positions according to a light path distance difference between one or multiple reflective layers of the object.

Alternatively, as illustrated in FIG. 9, a reflector of each of a light source device and a measuring device may include a distribution emitter configured to emit and receive light by simultaneously distributing light to a plurality of paths, and may be in a form in which a surface and an inner shape of an object are measured on the basis of a distribution of positions according to a light path distance difference between one or multiple reflective layers of the object.

Alternatively, as illustrated in FIG. 10, a reflector of each of a light source device and a measuring device may include an optical connector configured to emit and receive light via an optical fiber, and may be in a form in which a state of the optical fiber is sensed and measured on the basis of a distribution of positions according to a light path distance difference between one or multiple reflective layers of the optical fiber.

Figure 11:
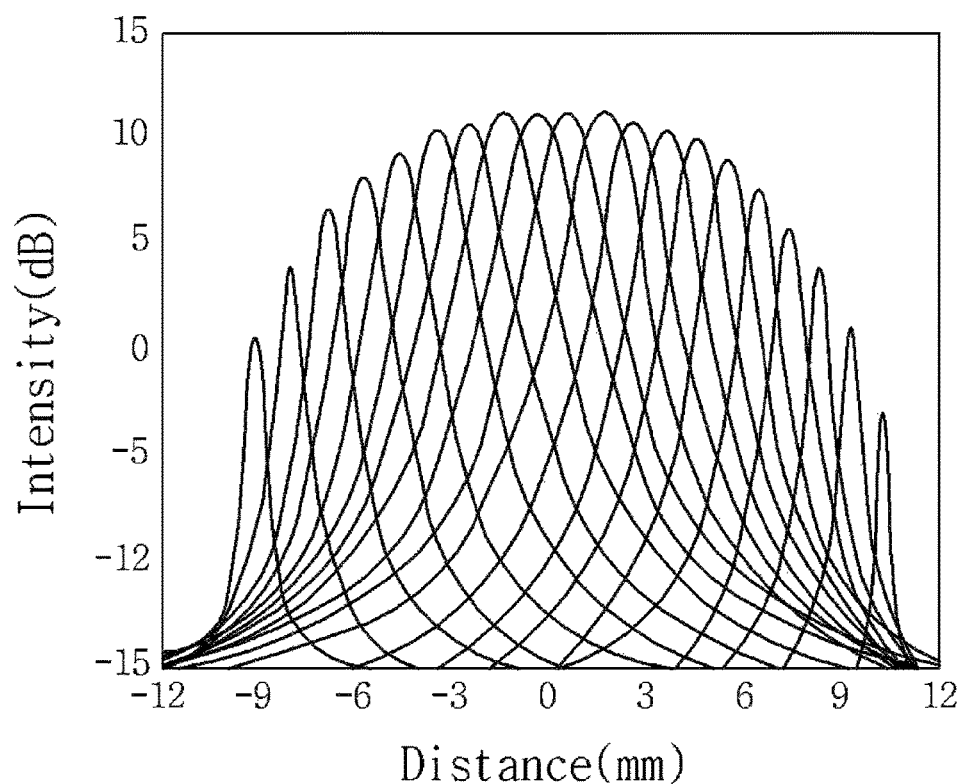
FIG. 11 illustrates an example of a measurement simulation in which a distribution of intensities of mode-locked oscillated output light is moved by 1 mm to be proportional to a location of a reflector by regularly moving the location of the reflector by 1 mm.

FIG. 11 illustrates an example of a measurement simulation in which a distribution of intensities of mode-locked oscillated output light is moved by 1 mm to be proportional to a location of a reflector by regularly moving the location of the reflector by 1 mm.

In a light source device and a measuring device which use a change in the intensity of mode-locked oscillated output light over time according to the present invention as described above, a periodic change in the frequency of an electrical signal corresponding to a change in the intensity of output light according to a mode locking condition for each of different light paths in a resonator is used.

In particular, the reflector of the light source unit is configured as a measuring means, and depth information may be obtained by identifying a section in which mode locking relatively occurs by checking an RF using a temporal position of an optical intensity output.

As described above, the present invention may be embodied in many different forms without departing from essential features of the present invention.

Accordingly, the embodiments set forth herein should be considered in descriptive sense only and not for purposes of limitation. The scope of the invention is defined not by the detailed description of the invention but by the appended claims, and all differences within the scope will be construed as being included in the present invention.

INDUSTRIAL APPLICABILITY

The present invention relates to a light source device and a measuring device which use a change in a cycle of an electrical signal corresponding to a change in the intensity of output light according to a mode locking condition for each of different light paths in a resonator.

What is claimed is:

1. A light source device using a change in intensity of mode-locked oscillated output light over time, the light source device comprising:
   an electrical signal generator configured to control intensity of an optical signal from the light source device; and
   an optical gain unit configured to be controlled by a periodic electrical signal having a cycle calculated by dividing a round-trip time of a photon corresponding to each of different light paths by an integer multiple; and
   a reflector configured to generate a reflective signal at a specific light path distance such that the reflective signal is oscillated at a maximum level when a specific periodic electrical signal corresponding to a mode locking condition is applied,
   wherein the intensity of the optical signal is controlled by the optical gain unit.

2. The light source device of claim 1, wherein, in a resonator of the light source device, a reflective optical gain unit, a light splitter, and a reflector are linearly located.

3. The light source device of claim 1, wherein, in a resonator of the light source device, a transmissive optical gain unit, a partial reflector, and a reflector are linearly located.

4. The light source device of claim 1, wherein, in a resonator of the light source device, a transmissive optical gain unit, a light circulator, a reflector, and a light splitter are located in a ring structure.

5. The light source device of claim 1, wherein a resonator of the light source device comprises a reflector including a scanning emitter configured to emit and receive light while changing a position thereof over time, the reflector being in a form in which a surface and an inner shape of an object are measured on the basis of a distribution of positions according to a light path distance difference between one or multiple reflective layers of the object.

6. The light source device of claim 1, wherein a resonator of the light source device comprises a reflector including a distribution emitter configured to emit and receive light by simultaneously distributing the light to a plurality of paths, the reflector being in a form in which a surface and an inner shape of an object are measured on the basis of a distribution of positions according to a light path distance difference between one or multiple reflective layers of the object.

7. The light source device of claim 1, wherein a resonator of the light source device comprises a reflector including an optical connector configured to emit and receive light via an optical fiber, the reflector being in a form in which a state of the optical fiber is sensed and measured on the basis of a distribution of positions according to a light path distance difference between one or multiple reflective layers of the optical fiber.

8. The light source device of claim 1, wherein a resonator of the light source device comprises an electro-optic device configured to control intensity of an optical signal by receiving a periodic electrical signal, in place of the optical gain unit.

9. A measuring device using a change in intensity of mode-locked oscillated output light over time, the measuring device comprising:
   an electrical signal generator configured to control intensity of an optical signal from a light source device;
   an optical gain unit configured to be controlled by a periodic electrical signal having a cycle time calculated by dividing a round-trip time of a photon corresponding to each of different light paths by an integer multiple; and
   a reflector configured to generate a reflective signal at a specific light path distance such that the reflective signal is oscillated at a maximum level when a specific periodic electrical signal corresponding to a mode locking condition is applied.

10. The measuring device of claim 9, wherein, in a resonator of the light source device, a reflective optical gain unit, a light splitter, and a reflector are linearly located.

11. The measuring device of claim 9, wherein, in a resonator of the light source device, a transmissive optical gain unit, a partial reflector, ad a reflector are linearly located.

12. The measuring device of claim 9, wherein, in a resonator of the light source device, a transmissive optical gain unit, a light circulator, a reflector, and a light splitter are located in a ring structure.

13. The measuring device of claim 9, wherein a resonator of the light source device comprises a reflector including a scanning emitter configured to emit and receive light while changing a position thereof over time, the reflector being in a form in which a surface and an inner shape of an object are measured on the basis of a distribution of positions according to a light path distance difference between one or multiple reflective layers of the object.

14. The measuring device of claim 9, wherein a resonator of the light source device comprises a reflector including a distribution emitter configured to emit and receive light by simultaneously distributing the light to a plurality of paths, the reflector being in a form in which a surface and an inner shape of an object are measured on the basis of a distribution of positions according to a light path distance difference between one or multiple reflective layers of the object.

15. The measuring device of claim 9, wherein a resonator of the light source device comprises a reflector including an optical connector configured to emit and receive light via an optical fiber, the reflector being in a form in which a state of the optical fiber is sensed and measured on the basis of a distribution of positions according to a light path distance difference between one or multiple reflective layers of the optical fiber.

16. The measuring device of claim 9, wherein a resonator of the light source device comprises an electro-optic device configured to control intensity of an optical signal by receiving a periodic electrical signal, in place of the optical gain unit.

17. A measuring device using a change in intensity of mode-locked oscillated output light over time, the measuring device comprising:
  an electrical signal generator configured to output periodic electrical signals having cycles calculated by dividing a round-trip time of photons corresponding to each of different light paths by an integer multiple such that the cycles change over time;
  an optical gain unit configured to generate light and amplify intensity of the light, under periodic control of a periodic electrical signal;
  a light splitter configured to split the intensity of light at a certain ratio; and
  a reflector configured to generate a reflective signal at a specific light path distance such that the reflective signal is oscillated at a maximum level when a specific periodic electrical signal corresponding to a mode locking condition is applied.

18. A measuring device using a change in intensity of mode-locked oscillated output light over time, the measuring device comprising:
  an electrical signal generator configured to output periodic electrical signals having cycles calculated by dividing a round-trip time of photons corresponding to each of different light paths by an integer multiple such that the cycles change over time;
  an optical gain unit configured to generate light and amplify intensity of the light, under periodic control of a periodic electrical signal from the electrical signal generator;
  a reflector configured to generate a reflective signal at a specific light path distance such that the reflective signal is oscillated at a maximum level when a specific periodic electrical signal corresponding to a mode locking condition is applied; and
  a partial reflector configured to transmit a part of the intensity of light and reflect the remainder.

19. A measuring device using a change in intensity of mode-locked oscillated output light over time, the measuring device comprising:
  an electrical signal generator configured to output periodic electrical signals having cycles calculated by dividing a round-trip time of photons corresponding to each of different light paths by an integer multiple such that the cycles change over time;
  an optical gain unit configured to generate light and amplify intensity of the light, under periodic control of a periodic electrical signal from the electrical signal generator;
  a light circulator configured to change a propagation path of the light output from optical gain unit;
  a reflector configured to generate a reflective signal at a specific light path distance such that the reflective signal is oscillated at a maximum level when a specific periodic electrical signal corresponding to a mode locking condition is applied; and
  a light splitter configured to split the intensity of light at a certain ratio.

20. A measuring device using a change in intensity of mode-locked oscillated output light over time, the measuring device comprising:
  an electrical signal generator configured to output periodic electrical signals having cycles calculated by dividing a round-trip time of photons corresponding to each of different light paths by an integer multiple such that the cycles change over time;
  an electro-optic device configured to be controlled by a periodic electrical signal from the electrical signal generator;
  an optical gain unit configured to generate light and amplify intensity of the light;
  a light splitter configured to split the intensity of light at a certain ratio; and
  a reflector configured to generate a reflective signal at a specific light path distance such that the reflective signal is oscillated at a maximum level when a specific periodic electrical signal corresponding to a mode locking condition is applied.

21. A measuring device using a change in intensity of mode-locked oscillated output light over time, the measuring device comprising:
  an electrical signal generator configured to output periodic electrical signals having cycles calculated by dividing a round-trip time of photons corresponding to each of different light paths by an integer multiple such that the cycles change over time;
  an electro-optic device configured to be controlled by a periodic electrical signal from the electrical signal generator;
  an optical gain unit configured to generate light and amplify intensity of the light;
  a reflector configured to generate a reflective signal at a specific light path distance such that the reflective signal is oscillated at a maximum level when a specific periodic electrical signal corresponding to a mode locking condition is applied; and
  a partial reflector configured to transmit a part of the intensity of light and reflect the remainder.

22. A measuring device using a change in intensity of mode-locked oscillated output light, the measuring device comprising:
  an electrical signal generator configured to output periodic electrical signals having cycles calculated by dividing a round-trip time of photons corresponding to each of different light paths by an integer multiple such that the cycles change over time;
  an electro-optic device configured to be controlled by a periodic electrical signal from the electrical signal generator;
  an optical gain unit configured to generate light and amplify intensity of the light;
  a light circulator configured to change a propagation path of the light;
  a reflector configured to generate a reflective signal at a specific light path distance such that the reflective signal is oscillated at a maximum level when a specific periodic electrical signal corresponding to a mode locking condition is applied; and
  a light splitter configured to split the intensity of light at a certain ratio.

* * * * *